(12) United States Patent
Rice (10) Patent No.: US 7,870,809 B2
(45) Date of Patent: Jan. 18, 2011

(54) HANDLEBAR ASSEMBLY

(76) Inventor: Michael Joseph Patrick Rice, 9 St. Georges Hill, Bathampton, Bath (GB) BA2 6RN ( * ) Notice: Subject to any disclaimer, the term of this patent is extended or adjusted under 35 U.S.C. 154(b) by 1365 days.

(21) Appl. No.: 10/487,756

(22) PCT Filed: Aug. 23, 2002

(86) PCT No.: PCT/GB02/03859

§ 371 (c)(1),
(2), (4) Date: Oct. 22, 2004

(87) PCT Pub. No.: WO03/018391

PCT Pub. Date: Mar. 6, 2003

(65) Prior Publication Data

US 2005/0085354 A1  Apr. 21, 2005

(51) Int. Cl.
*B62K 21/12* (2006.01)
*B62K 21/14* (2006.01)

(52) U.S. Cl. .................... 74/551.2; 74/551.1
(58) Field of Classification Search ............... 74/551.2, 74/551.1, 551.3; 482/57; 434/61
See application file for complete search history.

(56) References Cited

U.S. PATENT DOCUMENTS

| | | | | |
|---|---|---|---|---|
| 4,709,917 A | * | 12/1987 | Yang | 482/63 |
| 5,104,119 A | * | 4/1992 | Lynch | 482/5 |
| 5,209,662 A | * | 5/1993 | Fujita et al. | 434/61 |
| 5,240,417 A | * | 8/1993 | Smithson et al. | 434/61 |
| 5,584,700 A | | 12/1996 | Feldman | |
| 5,743,835 A | * | 4/1998 | Trotter | 482/57 |
| 6,056,672 A | | 5/2000 | Carbonell | |
| 6,234,800 B1 | * | 5/2001 | Koyama et al. | 434/61 |
| 2003/0121358 A1 | * | 7/2003 | Hissam | 74/551.2 |

FOREIGN PATENT DOCUMENTS

| | | | |
|---|---|---|---|
| DE | 4207805 A1 | * | 9/1993 |
| JP | 06 210023 A | | 8/1994 |
| WO | WO 01 29646 A | | 4/2001 |

* cited by examiner

*Primary Examiner*—Thomas R Hannon
*Assistant Examiner*—Justin Krause
(74) *Attorney, Agent, or Firm*—Christensen O'Connor Johnson Kindness PLLC (57) ABSTRACT

A handlebar assembly (100) is disclosed comprising a lower base portion (101) which is adapted to support a handlebar (202) through a guide means which is so constructed and arranged to permit the handlebar (202) to move along a path relative to the base portion (101) whereby upon movement of the handlebar (202) along the path to the left or the right relative to a central position the handlebar (202) tilts and the center of the handlebar (202) moves downwards relative to the base portion (101) as well as horizontally from the central position. The assembly allows the handlebars to move in a way which mimics the movement of the handlebars of a bicycle. In a modification, the guide means may restrain the handlebar for movement up/down or forwards/backwards or side to side, again to provide a more realistic range of movement.

10 Claims, 3 Drawing Sheets

HANDLEBAR ASSEMBLY

This invention relates to improvements in handlebar assemblies and in particular, but not exclusively, to a handlebar assembly which can be fitted to a stationary bicycle or any other device which includes a handlebar. It also relates to a handlebar assembly which can be used as a controller for a gaming console or personal computer.

It is well known to provide a stationary bicycle upon which a person can pedal to simulate riding a bicycle. The rider sits on the bicycle, which is fixed in position and turns the pedals of the bicycle against a resistive load. Other devices which include handlebars are JetSkis and motorbikes, and stationary versions of these (for use in training or entertainment) are also well known.

The stationary bicycle needs at least a saddle, a handlebar and a bottom bracket which must be held in the correct spaced location. The support for these components usually comprises a metal frame with floor standing feet which supports the saddle upon which the user sits at a convenient height. The frame also supports the bottom bracket below the saddle, and a crank with pedals which are operated by the users feet. The handlebar is supported in front of the saddle. To fit different people the relative position of the saddle, the bottom bracket and the handlebar must be adjustable, but are usually set up so that the handlebar and the saddle are the same height above the floor as the handlebars and saddle of a normal bicycle.

Dedicated stationary exercise bicycles are very effective at developing the specific leg muscles of a user but can be very tedious to use. Also, they do not provide a very realistic experience as the position of the handlebars is fixed when in use whereas on a normal bicycle the bars will move as the cyclist turns or lean to negotiate corners or stands up on the pedal.

More serious cyclists often use a turbotrainer to convert a normal road or mountain bicycle into a stationary exercise bicycle. In this arrangement the rear wheel of the bicycle is held above the ground and is used to drive a resistive load such as a small fan or flywheel. The fan or flywheel provides resistance to the rotation of the pedals. The use of an actual road bicycle provides more focussed and exercise specific training. However, the need to support the bicycle securely relative to the turbotrainer again prevents the user from training the handlebars or leaning. This is especially noticeable when the user is pedalling whilst standing up on the pedals.

It is known that pedaling whilst standing up requires different skills and uses different muscles of the cyclist when compared to cycling whilst sitting down. None of the prior art exercise devices are able to provide the user with training which specifically trains the rider whilst riding standing up (commonly referred to as honking).

The present invention is applicable to all forms of exercise cycle, including specific exercise bicycles as well as converted road or mountain bicycles used with a turbotrainer or the like. It is also applicable to controllers for computer games which the user can move to simulate the movement of the handlebars on a bicycle or other handlebar device.

It is an object of the present invention to provide a handlebar assembly which can be fitted to a stationary bicycle, or used on its own to provide a more realistic cycling experience and proper upper body exercise, whether for use with fitness equipment or for interactive gaming. It is also an object of the present invention to provide such a handlebar through retrospectively attachable means, only needing the bars changed, not the full bike, providing for easier manufacturability and greater safety reference movements in the centre of gravity.

According to a first aspect the invention provides a handlebar assembly comprising a lower base portion which is adapted to support a handlebar through a guide means which is constructed and arranged to permit the handlebars to move along a path relative to the base portion whereby upon movement of the handlebars along the path to the left or the right relative to a central position the handlebar tilts and the centre of the handlebar moves downwards relative to the base portion as well as horizontally away from the central position.

By providing such a handlebar assembly the rider can move the bars in a natural way similar to the actual technique used when cycling. The apparatus therefore simulates the side to side movement of the handlebar of a bike leaning when it is ridden and so provides a more natural feel to the user, especially when riding whilst standing up or banking.

The guiding means may comprise one or more links defining a linkage. Alternatively it may comprise one or more tracks defining a guide rail. The or each track may be secured to the base or the handlebar and co-operate with one or more runners, such as wheels or guide arms, attached to the other of the handlebar or the base portion.

The path of the centre of the bars may comprise a curved path, for example an arc, centred about a pivot point located below the centre of the handlebar. Of course other path shapes may be defined by suitable arrangements of linkages or rails. The guide rail itself defines the arc in this embodiment, where runners connect the handlebars to the guide rail. It is to be understood that the base portion remains stationary whilst the handlebar is moved by the user.

It is preferred that the handlebar is supported in a horizontal position when in the central position, although this is not essential in all embodiments.

The base portion may include a pivot located close to the floor, and the linkage may comprise an upright link which is connected to and pivotally extends from the pivot to the handlebar such that the handlebar when moving along the path away from the central position leans through an arc centred on the pivot point of the upright link.

The handlebar assembly may be located on a floor with the base portion locating the pivot at floor level or just above with the upright supporting the handlebar at a position above the floor which corresponds to the height of the handlebar on a normal bicycle. The pivot point may be at floor level or just above or at the same height above the floor as the bottom bracket of a normal bicycle. By normal bicycle we mean any bicycle such as a mountain bike or a road bike set up correctly for a user of the bicycle.

Typically the upright may support the handlebar at least 30 inches above the pivot, with the pivot being located less than 12 inches, and preferably as close as possible to the floor. The height at which the handlebar is supported may be adjustable by the user.

Placing the pivot point close to the floor effectively replicates the contact patch of the front wheel of a normal bicycle in which the handlebars lean about an arc centred on the contact patch.

The upright link, or a member attached to it spaced from the pivot, may pass through control means which is adapted to control the range of movement of the upright link. The control member may, for example, comprise an opening in a control plate with the link passing through the opening, the walls of the opening constraining the movement of the handlebar. The opening may define a slot which may be a complete circle or may comprise two or three or possibly more slots radiating from a central point in a T-shape.

The base portion may be an integral part of a frame of a stationary exercise bicycle. Alternatively, it may be independent of a frame of a stationary exercise cycle and can simply be placed on the floor at the front of the cycle to support the handlebars off. This may be attachable to a portion of a stationary exercise bicycle or bicycle/turbo trainer frame to provide stability to the handlebar or may be a free standing structure. The base portion may also provide a further support for the complete unit.

One or more floor engaging feet may be provided on the base portion which may be adjustable.

In some cases it may be preferred to provide a handlebar assembly which can be used as a direct replacement for the handlebars of a dedicated stationary exercise bicycle or a converted bicycle or other device such as a motorbike or JetSki for stationary use.

The linkage may therefore, in an alternative arrangement, comprise at least two nonparallel links, each link being connected at one point along the link to the base portion and at a different point along the link to the handlebar or a support thereto. The links may lie in a substantially vertical plane.

The link may be adapted such that a vector connecting the two points of the one link crosses a corresponding vector that connects the two points on the other link at a vial pivot point which lies below the base portion, the handlebar being construed to move along a path which may be an arc and is dependent upon the geometry of the links. This therefore makes the handlebars tilt and drop when moved away from the centre, as described earlier providing a close replica of the movement of a real set of handlebars attached to a bicycle or the like.

It is to be noted that as the handlebar is moved along its path in this arrangement the position of the virtual pivot point will also move.

Thus, instead of requiring an actual physical pivot located close to the point at which a front wheel would contact the ground a virtual pivot is provided. This allows the lowest point of the base portion to be closer to the handlebar.

The two points where the links join the base portion may lie in a horizontal plane for all positions of the handlebar, whilst the two points where they join the handlebar may lie in a horizontal plane only when the handlebar is its central position. The two points at which they join the handlebar may be spaced apart further than the points where they join the base portion, both links leaning outwardly away from one another when the handlebar in its normal rest position. The centre of the handlebar may lie centrally between the two points of connection of the linkage to the handlebars.

The spacing between the two points where the links join the handlebar may be adjustable or may be fixed. Adjusting these points allows the curved paths along which the virtual pivot point moves and the path long which the handlebar moves and the angle of deflection (rotation) of the bars to be varied to simulate different types of device.

The vectors may cross at a distance below the handlebars which is equivalent to the height of the handlebars above the floor. For instance, they may cross to define a virtual pivot point at least 30 inches or more below the handlebar to simulate a normal bicycle. Again, this may be set up so as to provide the centrally positioned virtual pivot point on the bottom bracket of a normal bicycle.

The distance between the two points on at least one of the links—the effective length of the link—of the linkage may also be adjustable or may be fixed. It is most preferred that the effective length of both links is variable. This permits the location of the virtual pivot point relative to the handlebar to be varied to move it closer to or further from the handlebar. Such an arrangement allows the user to position the pivot point at floor level whilst the handlebar is used at different heights above the floor and to accommodate different feels to simulate different types and sizes of bicycle. For instance, if it is secured to the head tube of a child's bike the pivot point will need to be different than that required if it is fitted to the higher head tube of a gentleman's bicycle.

The horizontal spacing between the point where the two links join the top link may also be varied, as mentioned above, to accommodate different feels to closely approximate the behaviour of different types and sizes of bicycle or other device.

In this arrangement the base portion nay comprise a stem shaft which is adapted to be at least partially received within the headtube of a bicycle or stationary exercise bike or the like. It may comprise a quill shaft. A further support/brace may be provided connecting to the frame of the bicycle to provide greater rigidity and resilience to turning forces.

Height adjustment means may further be provided to permit the handlebar to be raised and/or lowered relative to the base portion. It may be raised/lower relate to the support for the upright link (where provided) or the stem shaft (where provided).

In a simple arrangement the height adjustment means may permit the handlebar to be raised or lowered along a linear path. This is preferably a path which coincides with a vector that passes along the centre of the headtube of a bicycle.

In a refinement, to simulate the path of the handlebars on a real moving bicycle the height adjustment means may constrain the upward and downward movement of the handlebar relative to the be portion to move about a point which would correspond to the point of contact of the rear wheel of a bicycle with the ground.

The height adjustment means may therefore additionally allow the handlebars to move up or down through an arc centred on the contact patch of the rear wheel of a bicycle to which the handlebar assembly is fitted. This allows the user to pull the handlebars upwards towards their body to simulate lifting the front wheel of a bicycle from the ground whilst the bars rotate along their length. This may also be provided about a smaller radius and arc and indeed may be provided by an alternative embodiment of the trapezoid linkage set up in a substantially vertical plane.

Therefore, upwards/downwards movement may be provided by a second pair of non-parallel links which lie in a generally vertical plane which are each connected at a first point to the handlebar and at a second point to the support. The links may define a trapezoid with the plane of the trapezoid being substantially orthogonal to the plane of the two links which provide the side to side tilt (honking) where provided.

Of course, an alternative guide means such as a guide rail or a single upright link may be provided to achieve this movement.

This movement simulates the rider pushing down on the front and pulling up to jump/wheelie. This may also be provided by an extendable/compressible stem. Both are disclosed in the drawings.

The linkage may also be adapted to permit the handlebar to move—for example by sliding—forwards or backwards relative to the base portion. This may be provided by connecting the linkage to a plate or bar which can slide forwards and backwards relative to the support. This may also be provided about a forward/backward pivot, substantially about the x-arts, and indeed may be provided by an alternative embodiment of the trapezoid linkage set up in a substantially horizontal forward facing plane (as opposed to the sideways plane of the current trapezoid). Simulating moving weight forward and backward.

The forward/backward movement may be in addition to the tilt and up/down movement or any combination.

Furthermore, the handlebar may be adapted to be rotated in a plane relative to the base. For the most realistic of handlebar movement this rotation should be about an axis which passes along the centre of the stem that supports the handlebar. This would provide an axis of rotation that is approximately vertical but would be defined by the angle of the headtube of the bicycle, so simulating turning the handlebars to steer.

The handlebar assembly may constrain the handlebars against movement in any direction other than those described herein before (i.e. other than leaning forwards/backwards or up/down).

Resistance means may be provided to oppose the movement of the handlebars against any or all of its degrees of freedom. It may for instance oppose the movement of the bars to the left and or to the right. It may additionally or alternatively oppose upward and or downward movement of the handlebar. It may also additionally or alternatively oppose forward or backward movement of the handlebar relative to the support.

The resistance means may be adjustable to vary the amount of resistance to movement of the handlebar. The adjustment may be mechanical or electronically controlled.

The resistance means may include one or more dampers which damp the movement of the handlebar. The, or each, of the dampers may also be adjustable to vary the amount of damping provided. The damper may comprise a twist damper or any other suitable type of damper.

The resistance means may comprise one or more springs, which may be a fixed rate, or a variable rate spring. Coil springs, leaf springs or elastomer springs may be used.

The resistance and/or damping means may oppose the movement of the handlebar about any of its degrees of freedom. All resistances and damping may be adjustable by the user or automatically adjustable by a microprocessor, controlled manually or automatically through mechanical and electronic means.

The resistance may also be adjustable through adjustment to the bike's pedaling resistance adjustment means, through electrical or mechanical connections.

Locking means may also be provided to enable the handlebars to be locked against movement about any or all of its degrees of freedom. This lock may be controlled manually or automatically through mechanical and electronic means.

Where the linkage comprises two non-parallel links defining a linkage the resistance means may comprise at least one spring which interconnects a portion of a link with the base portion.

The handlebar assembly may be incorporated into a stationary exercise bicycle. It may be used as a replacement for the conventional handlebars on a normal bicycle which may be used on a turbotrainer. It may also be used on a tabletop or other surface with a suitably shaped base portion.

The handlebar assembly may include at least one out device which is dependent on the position of the handlebar relative to the base portion. For example, this may comprise a potentiometer which produces a varying output value dependent on the position of the bars.

If the handlebar can move through four or more degrees of freedom (eg turn left/right, lean left/right, lean forward/back and lift-up/squeeze-down), four or more output devices may be provided, each indicating the position or the handlebar about a respective degree of freedom.

The handlebar assembly may further include one or more switches or buttons which can be operated by a user. These, and the aforementioned output devices, may be connected to a PC or games console through one or more electrical cables and industry standard electronics. The output devices, buttons or switches can be used to replace the keypads normally associated with game consoles such as the Sony Playstation. This permits the handlebar assembly to be used as a game controller with the handlebars and buttons controlling the operation of a game on the console. For instance, tilting the handlebar left may cause a character or object in a game to move left or turn left.

The handlebar assembly may further include a display upon which information can be presented to the user of the handlebars. The information may include a count valve dependent on the number of times the handlebar has been moved left and/or right, and/or time elapsed time.

An alternative embodiment, the guide rail version, provides the arc for the handlebars to follow, mapped on the real arc of the bars on a real bike, with the handlebars connected to a runner assemble which permits the handlebars to move along the guide rail and in doing so, tilt and drop as moved away from central position. Resistances may be provided as described above and all other movements may also be allowed.

It is of course envisaged that the mechanism disclosed here may be used in a position in which it is flipped onto its side.

According to a second aspect the invention provides apparatus, such as a stationary exercise bicycle, having a frame, a seat and a handlebar assembly in accordance with the first aspect of the invention in which the frame supports the handlebar assembly and the seat above a floor.

The apparatus may alternatively comprise a motorbike, a JetSki or a bicycle mounted on rollers or a Turbotrainer, or any other apparatus which has a handlebar and a seat.

The handlebars may move about a point aligned with the centre of the handlebars which may be equivalent to the contact point of a front wheel of the bicycle, or a point which is the same height above the floor as the bottom bracket of the bicycle.

The linkage may comprise a non-parallel trapezoidal linkage comprising two which form the sides of a trapezoid with the handlebar forming the top of the trapezoid and the support forming the bottom of the trapezoid.

The handlebar assembly may include a resistance means which may provide a variable resistance to movement as a function of the speed at which the rider is pedalling the cycle.

The bicycle may provide variable resistance to pedalling. In that case, the resistance to movement of the handlebars may be dependent upon the resistance provided by the bicycle to pedalling. The resistance of the movement of the handlebar may automatically be adjusted by the handlebar assembly to match the resistance to pedalling, or the user may be prompted to manually adjust the resistance. A common gear lever may be provided which mechanically adjusts the resistance to pedalling and the resistance to movement of the handlebar, possibly using one or more cables.

The seat may be supported by a guide means which permits movement of the seat from side to side and/or up/down and/or forwards/backwards about a curved path. This may comprise any guide portion conducted along the principles of the guide means for the handlebars. For example, the seat may be supported by two nonparallel links connected at a first point to the seat (or a seat support) and at a second portion connected directly or indirectly to the frame (or any point fixed relative to the frame).

According to a third aspect the invention provides exercise apparatus comprising an upper body exercise device movable between a first position and a second position by the upper body of a user, a lower body exercise device movable between a first position and a second position by the lower body of a user, sensing means comprising at least a first sensor associated with the lower body exercise device and a second sensor associated with the upper body exercise device, a processor which receives output signals from the sensing means and generates a processed signal from the output signals and a display means upon which the processed signal is displayed to a user.

A training map may be provided which is accessed by the processor, the map being indicative of a training programme of exercise to be performed by the user on the device. More than one map may be stored.

The processing means may be adapted to determine the level and or rate of exercise performed by the user from the output signals and compare this with the level or rate given in the training map. This may be done continuously as the exercise is performed. The processed signal sent to the display may be dependent upon the difference between actual exercise and that held in the map.

The upper and lower body exercise devices may present a resistance to the user, which may be independently adjustable. The resistances may be adjusted automatically by the processor as a function of the training map. The processor may produce a training map whilst the apparatus is being used by a user which is dependent upon the performance of the user as determined by the sensors. They may, for example, sense the rate of repetition of movement of the upper and or lower body devices, and/or the resistance against movement.

The apparatus may include a display and/or speaker which prompts the user to manually adjust the upper and or lower devices in accordance with the training map. The map may be displayed visually and/or audibly as a bar graph on a display screen. Alternatively, arrows may be displayed corresponding to a prompt for the user to increase the resistance or to decrease the resistance.

The microprocessor may output to a display 308 (and optional speakers) one or more processed signals dependent on the actual and cumulative variation in actual performance as against that required in the training map. The training programme may adjust later training maps on the basis of this performance and the user's training history.

According to a fourth aspect the invention provides a handlebar assembly comprising a lower base portion which is adapted to support a handlebar through a guide means which is so constructed and arranged to permit the handlebars to move both vertically and horizontally along a curved path relative to the base portion which lies in a plane orthogonal to the long axis of the handlebar whereby upon movement of the handlebars along the path relative to a central position the handlebar rotates about its long axis and the centre of the handlebar moves upwards and/or downwards relative to the base portion as well as horizontally away from the central position. This allows the "rider" to push down/pull up on the handlebar to simulate raising or lowering of the front wheel of a bicycle or other apparatus.

The guide means may comprise two links which are each connected to the handlebar at a first point and to the frame at a second point along the links.

The links may lie in a substantially horizontal plane which may be aligned orthogonal to the long axis of the handlebar.

It will, of course, be understood that the guide means may take any other form such as those described in relation to the first aspect of the invention. Indeed, it is envisaged that any arrangement in which the handlebar can move to closely simulate the movement of a handlebar of a bicycle will fall within this aspect of the invention.

According to a fifth aspect the invention provides a handlebar assembly comprising a lower base portion which is adapted to support a handlebar through a guide means which is so constructed and arranged to permit the handlebars to move forwards and/or backwards along a cured path in a vertical plane relative to the base portion.

The guide means may again take many forms, although in a most convenient arrangement the guide means may comprise a pair of non-parallel links (similar to that for the first aspect) which connect at a first point to the bar (or a support thereto) and at a second point to the base, the links lying in a vertical plane with a line intersecting the two points where they join the base being in a horizontal plane and being in line with the direction of movement of the handlebar. This permits the handlebar to mimic a forward/backwards motion as occurs if a rider is displacing their weight forwards or backwards on a bicycle.

Alternatively, the link may be arranged such that the line intersecting the two points where the links join the base lies in a substantially vertical plane whilst the links lie in a vertical plane orthogonal to the long axis of the bars. This allows the bars to move in such a way as to mimic movement of a real handlebar up or down.

Of course, other guide means may be provided such as a guide rail or track.

According to a sixth aspect the invention provides a seat mechanism adapted to support a seat relative to a base, such as a frame of a bicycle or the like, the seat mechanism comprising a guide means which is so constructed and arranged to permit the seat to move along a path relative to the base whereby upon movement of the seat along the path to the left or the right relative to a central position the seat tilts and the centre of the seat moves downwards relative to the base as well as horizontally from the central position.

The guide means may comprise at least two nonparallel links connecting the seat to the base. These links may lie in a substantially vertical plane or may be inclined away from the vertical.

According to an seventh aspect of the invention there is provided an exercise apparatus comprising an upper body exercise device movable between a first position and a second position by the upper body of a user, a lower body exercise device movable between a first position and a second position by the lower body of a user, a first resistance means for controlling the resistance to movement of the upper body exercise device and second resistance control means for controlling the resistance of movement of the lower body exercise device, and means for controlling the first and second resistance means in dependence upon the rate of movement and/or the resistance setting of the first or second exercise device.

The upper body exercise device may comprise a handlebar assembly in accordance with the first aspect of the invention. The lower body exercise device may comprise a pair of pedals, in which case the second resistance means may comprise a weighted flywheel or magnetic brake.

For example, when the user is pedalling quickly the resistance of the handlebar assembly to movement may be lower than when they are pedalling slower.

In an alternative, the resistance of both devices may be varied in accordance with a different parameter, other than the rate of movement. Indeed, any device in which the setting of the first resistance is in some way related to the resistance of the second resistance (or vice versa) may be considered to fall within the scope of this aspect of the invention.

The co-ordination of resistances can be done by mechanical or electrical means.

There will now be described by way of example only three embodiments of the accompanying drawings with reference to the accompanying drawings of which.

Figure 1:
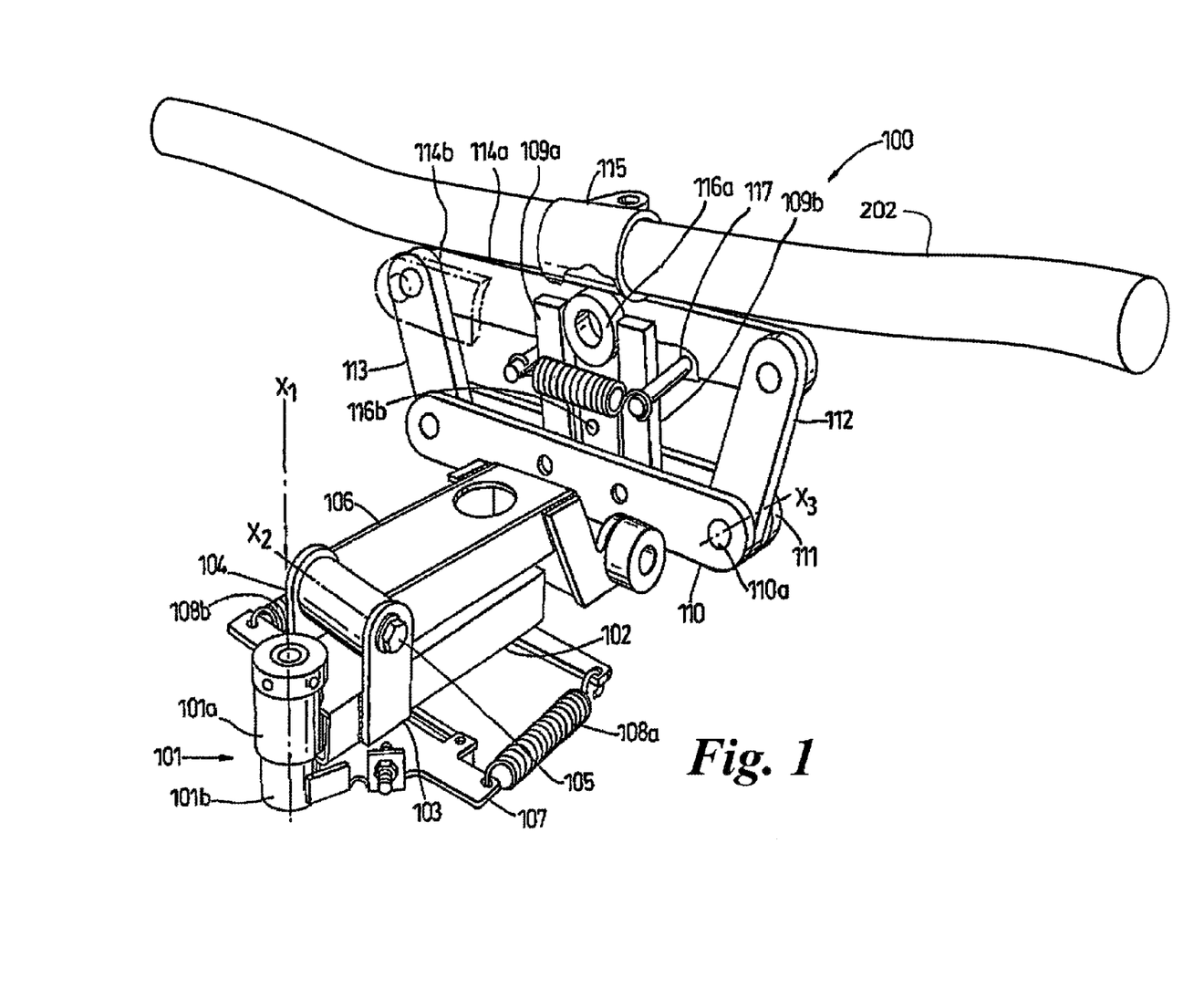
FIG. 1 is a partial perspective view of a first embodiment of a handlebar assembly in accordance with the present invention.

As shown in perspective in FIG. 1 a first embodiment of a handlebar assembly 100 comprises a base portion or support 101 which consists of a tubular quill stem of approximately 1 inch diameter which can be held securely in a headtube of a cycle frame (not shown). The stem has an upper portion 110a which can rotate relative to a low portion 101b clasped to the bicycle. A sensor such as a potentiometer (not shown) measures the rotation of the upper portion 110a relative to the fixed lower portion 101b.

Extending forward from the upper portion of stem 110a is a lower metal bar 102 which is provided with two upstanding lugs 103, 104 along each edge adjacent the stem. The lugs are spanned by a pivot bolt 105 which supports one end of a second upper, metal bar 106. The second metal bar 106 also extends from the stem 101 in a direction away from the pivot 105 and overlays the first bar. A compression spring (not shown) separates the two bars but allows the second bar 106 to be pivoted about the pivot 105 against the force of the spring. This allows for squeezing the bars down. A further compression spring (not shown) resists the bars being pulled up. Damping may be provided against each movement also.

A bracket 107 is secured to the lower stem portion bib, and two springs 108a, 108b connect the lower bar 102 to the bracket. This controls rotation of the upper second bar 106 relative to the bicycle, simulating turning and providing for resistance and return to a central position. A damper may also be provided (not shown).

The end of the second (upper) bar 106 terminates with a forked section 109 which carries two bearings that support the ends of an axle 110a. The axle supports a trapezoidal linkage assembly. The whole assembly can be tilted forwards or pulled backwards about an axis defined by the axle. A potentiometer (not shown) measures the position of the linkage relative to the upper bar 106 as it is moved about the axis or the axle.

The linkage assembly comprises two horizontal lower bars 110, 111 which are spaced apart horizontally either side of the upwardly extending portion of the second bar. The lower bars define the lower edge of a trapezoid and are fixed to the axle or a plate extending therefrom.

Two links 112, 113 of the trapezoid extend upwards from a respective pivot point at the end of the horizontal bars. The links 112, 113 are not quite vertical but instead lean out slightly and connect at their uppermost ends to the ends of upper horizontal bars 114a and 114b.

Two upper bars 114a and 114b are supported by the top of the links 112, 113. The links carry a clamp 115 which can be secured rigidly to a handlebar 202 which can be gripped by a user. In use, the handlebar can be tilted to the left or right along restrained path defined by the geometry of the trapezoidal linkage.

The two links 112, 113 are aligned so that a vector extending from one link 112 crosses a vector extended from the other link 113 at a point directly below the handlebars which would correspond to the contact patch of a tyre of the cycle with the road.

To control the movement of the handlebar a central stop 116 is provided which is located centrally on one of the upper bars 114a and extends across towards the other bar 114b. Two control rods 109a, 109b are pivotally attached at a lower end to a point along one of the lower bars and extend up along opposite sides of the stop 116a. A coil spring assembly 117 connects the two control rods to bias them together onto the stop. In the illustration the coil spring assembly comprises two coil springs which are arranged in parallel and are connected at their ends to two pins which contact the outside of the control rods, in practice being inserted through the control rods. In the normal position of the handlebar the rods pass and touch opposing sides of the stop and are held generally in contact with the stop by the spring.

As the handlebar is moved to the left away from the central position the stop pushes one of the control rods to the left. The other is prevented from moving left by a second stop 116b on the lower bars. Thus, the movement of the handlebar stretches the spring assembly which provides resistance. The exact opposite occurs when the handlebar is moved to the right. Damping may also be provided.

In a modification, not shown, the first embodiment may include an extended rod 112 and an extended base coming from the far left of 110/111 (providing a static base). Connecting from this static base and the extended rod 112 is a standard damper with compression springs on each side of the piston rod's extensions. This therefore provides bump free springing, damping for both left and right movements.

This embodiment demonstrates a four axis movable assembly, allowing movement left/right about X1, lift-up/squeeze-down about X2, lean forward/pull back about X3 and the lean left/right as described above.

Each movable means includes preset, adjustable or automatically adjustable springs and (optionally) dampers. Potentiometers are also included (not shown) which sense the movement of the bars.

At each end of the handlebar is a handgrip (also not shown) of soft rubber and a brake lever. The brake lever can be operated to control an analogue switch connected to the handlebar assembly.

Figure 2:
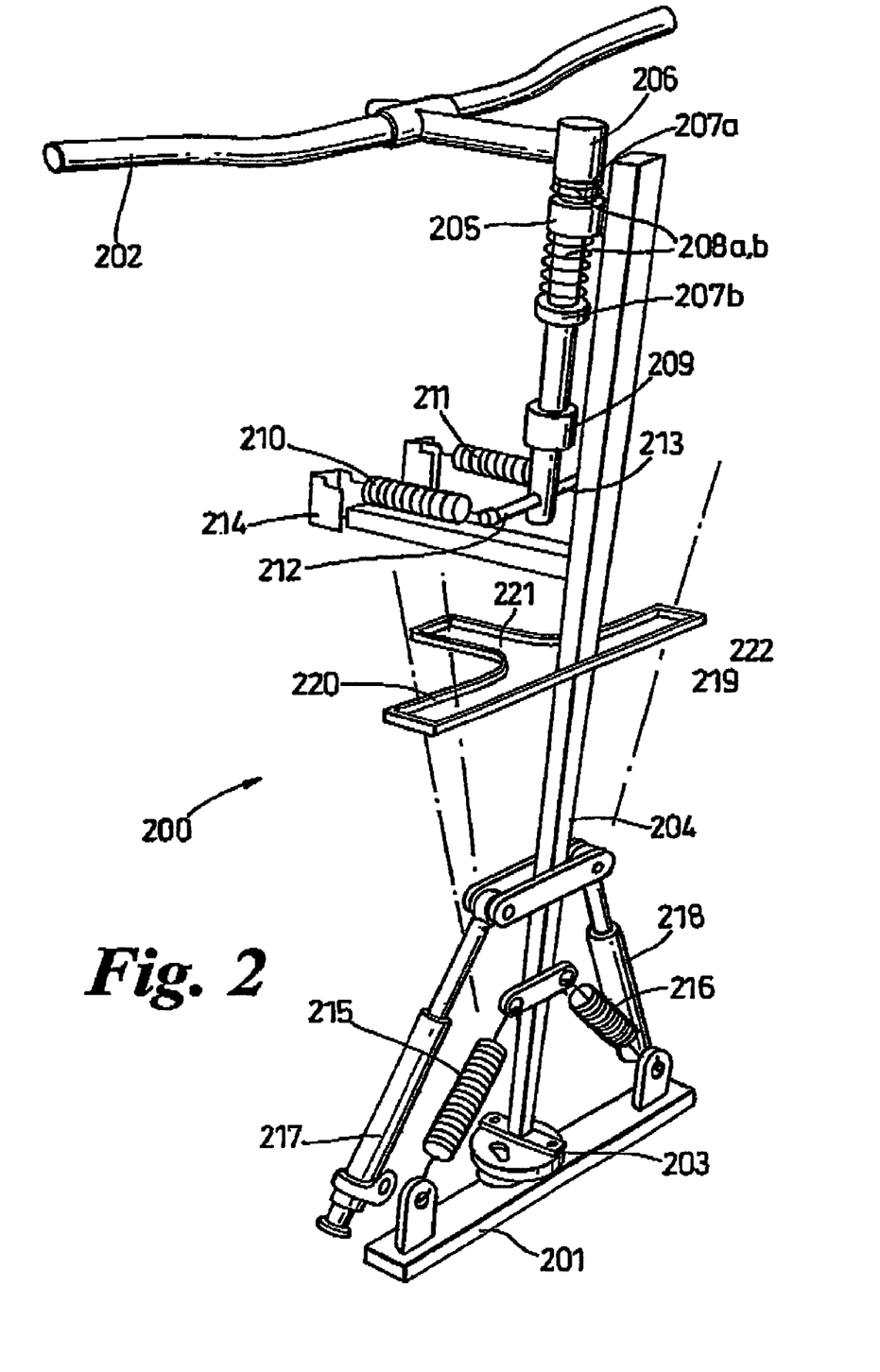
FIG. 2 is a partial perspective view of a second embodiment of a handlebar assembly in accordance with the present invention.

A second, alternative embodiment of a handlebar assembly 200, is illustrated in FIG. 2 of the accompanying drawings. As for the first embodiment the assembly comprises a base portion 201 and a handlebar 202 which is connected to the base by a linkage. The key difference is that the base portion of the assembly of FIG. 2 is intended to be mounted on the floor and holds the handlebars 202 at the correct height for the user to simulate the handlebar of a bicycle. In the first embodiment the provision of a virtual pivot point that is below the base allows it to be mounted on a separate stand such as a table or to be bolted to the head tube of a cycle as a replacement for a normal set of handlebars.

The assembly 200 comprises a base 201 which has a centrally located pivot 203, which may be a universal joint. An upright elongate metal bar 204 extends upwards from the joint 203. Towards the top of the upright bar 204 is provided a collar 205 which slidingly receives a handlebar stem 206. The handlebar stem 206 in turn supports the handlebar 202 of a cycle. The handlebar is therefore arranged to pivot about the pivot point 203 at the base of the upright bar 204 which simulates the range of movement of an actual set of handlebars when riding a bike and leaning the bike from side to side.

Two stops 207a, 207b are provided at spaced locations on the stem 206 with one stop on each side of the collar 205. Between each stop 207a, 207b and the collar 205 is a coil spring 208a and 208b. The coil spring biases the stem into a normal rest position with the stops spaced from the collar. In use, the stem can be pushed down or pulled up relative to the upright support against the resistive force provided by the springs. Damping and potentiometers are also provided. A second lower collar 209 spaced from the first, also slidingly receives a portion of the stem 206 to prevent the stem from rocking from side to side.

The collars 205, 209 also allow the handlebar to be rotated around the axis of the handlebar just like a real bicycle. To control the rotation two short coil springs 210, 211 are provided which are alternately compressed or placed in tension as the handlebar is turned. Damping and potentiometers are also provided. One spring 210 acts between a short removable locating rod 212 which extends perpendicularly from a lower end of the stem and a locating bracket 214. The other acts between a short locating rod 213 which extends from the lower end of the stem on the opposing side to the first and the bracket 214. The bracket 214 is welded to the upright link 204. Damping can also be included.

The locating rods 212, 213 can be removed allowing the handlebar to be spun freely through 360 degrees by the user to simulate tricks performed on a bicycle.

The pivot 203 at the base of the upright link 204 permits the upright link 204 to tilt from left to right (when the user views the handlebars from a normal riding position) by moving the handlebars. It also allows the handlebar to be pushed forwards or pulled backwards by the user. To control this movement, the assembly incorporates additional structural components which act against the upright link 204.

To control movement of the handlebar to the left or right a pair of coil springs 215, 216 and dampers 217, 218 are connected between the base and the stem. A first one of the coil springs 215 is compressed as the handlebar 202 is pushed to the right and the other is simultaneously placed in tension. If the handlebar is pushed to the right the first coil spring 215 is placed in tension whilst the other is compressed. The springs 215, 216 are arranged so that when the handlebar is in its normal rest position (without the user holding them) they are held centrally.

A similar set up (not shown) is provided for the forward/backward movement of the bars, being exactly as per above for left/right movement but duplicated and rotated through 90 degrees.

Additional control of the movement of the handlebar 202 is provided by a control plate 219 which is fixed in position relative to the base about midway up the upright bar. The support for the control plate 219 is not shown in FIG. 2.

The plate 219 has three slots 220, 221, 222 cut into it which meet at a common point to form a generally T-shape. The slots are coated with a low friction material or are cut into a plate of low friction material, and guide runners (not shown) control smoothness and quietness. The upright bar passes through the slot and can only move along the slot. The slot forming the stem of the T-shaped slot faces away from the user when holding the handlebar and springs (also not shown) pull the upright link 204 into the centre of the slot when the handlebar is not in use, as assisted by the forward/backward springs and dampers as above. This locates the bar in an upright position. This position allows the user to push the handlebar forwards or pull it backwards towards themselves but stops them pushing the handlebar to the left or to the right.

The user can pull the handlebar towards him/herself to pull the upright to the top of the stem of the T shaped slot against the spring. The upright can then be moved to the left or the right along the head of the T-shaped slot. This is the position shown in FIG. 2 of the drawings. This emulates the real cyclist pulling forward on the bicycle, closer to the handlebars, when they stand off, the seat to "honk".

The provision of the T-shaped slot 220, 221, 222 prevents the handlebar from tilting until the bar is pulled towards the user. This position with the bar closer to the user mimics the position of a rider when riding standing up on a bicycle—often referred to as honking.

The control slot could, of course, be omitted if preferred or a different shape of slot could be used to provide alternative paths of movement of the handlebars. A circular orifice would allow unrestricted movement within the slot.

Whilst the use of simple coil springs has been described for the two illustrated embodiments other means for providing resistance to movement of the handlebar could be used. The coil springs could be replaced by elastomer springs, and dampers could be included to provide additional control of the movement of the handlebar. The force provided by the resistance may also be variable by the user. For example, a high resistance could be used to help develop upper body strength whilst a lower resistance could be used more accurately to mimic the forces on a set of handlebars when actually riding a moving bicycle.

Figure 3:
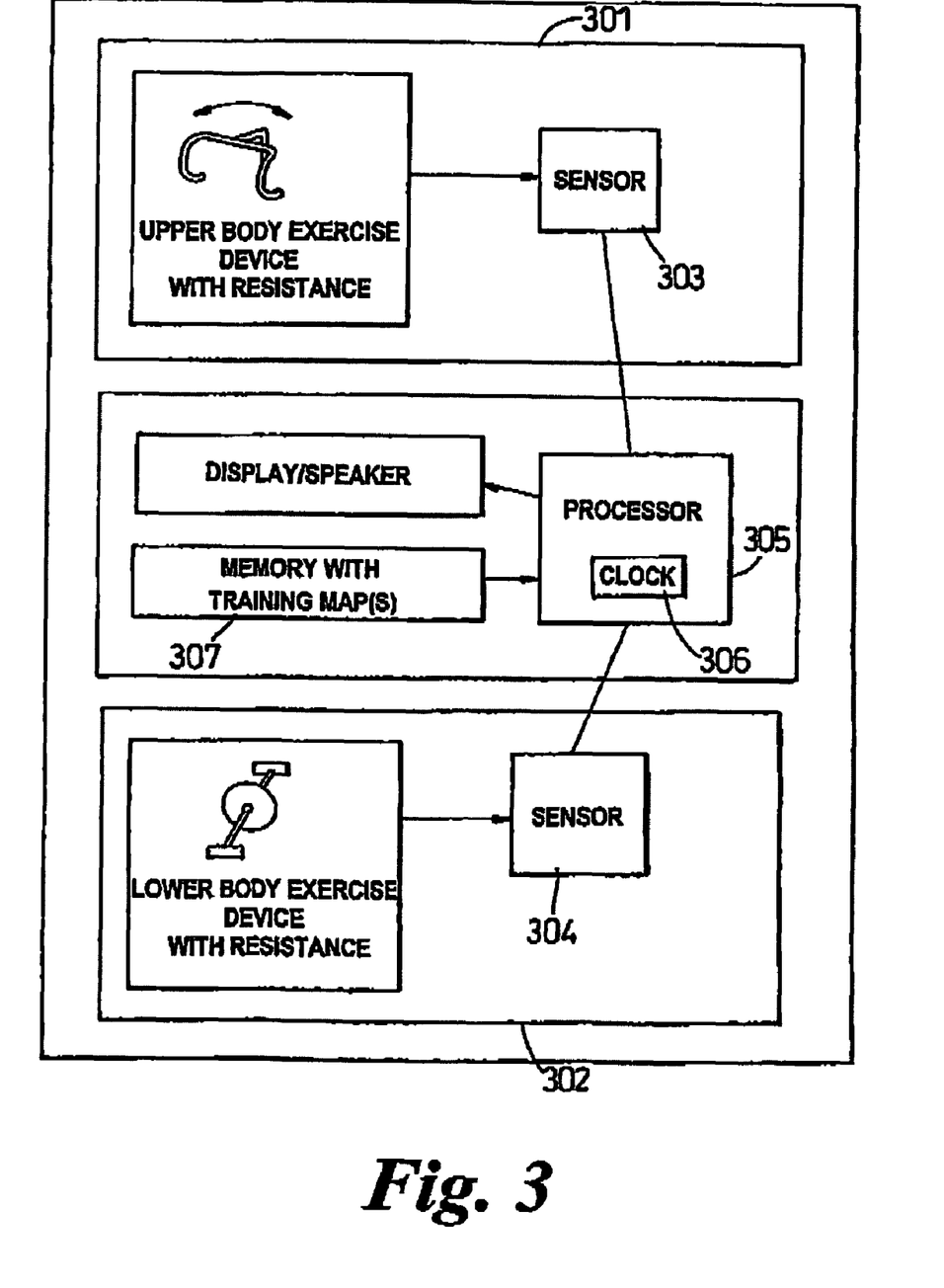
FIG. 3 is a block diagram of an apparatus in accordance with a third aspect of the present invention.

FIG. 3 of the accompanying drawings is a diagram illustrating the key components of an exercise apparatus in accordance with a third aspect of the invention.

The apparatus comprises a bicycle which define both an upper body exercise device 301 and a lower body exercise device 302. For example, the upper body device 301 may comprise a handlebar assembly as illustrated in FIG. 1 or 2 of the accompanying drawings. The lower body exercise device 302 may comprise a pedal assembly of a stationary bicycle which can be pedalled by a rider against a resistance mechanism.

The user exercises with the lower body exercise means 302 (in this example the pedals) and moves the independent upper body exercising means 301 with their arms (in this example the handlebars of the present invention) against lower and upper body resistance means. A first sensor 303 is located in the resistance mechanism for the handlebar and a second sensor 304 is associated with the resistance mechanism of the pedals. Each sensor 303,304 produces an output signal indicative of the resistance setting.

Additional sensors (not shown) on the bike and handlebars measure each repetition of the exercise being performed, i.e. each revolution of the pedals and each time the handlebar is moved form side to side. The signals from the sensors are received by a microprocessor 305 attached to the handlebar and are measured and recorded. The processor 305 has an internal clock 306 which permits the rate of repetition to be determined and is connected to an area of electronic memory 307. The memory stores one or more training maps which can be selected by a user, and the processor compares the outputs of the sensors with values in the training map. The selected training map sets out the required resistances and rates of repetition mapped over time representing a training workout. The microprocessor 305 outputs to a display 308 and speakers one or more signals dependent on the actual and cumulative variation in actual performance as against that required in the training map. The training programme may adjust later training maps on the basis of this performance and the user's training history.

All resistances may be preset, adjustable by the user or adjustable automatically in response to a microprocessor-based unit. All movements may also be provided without a return to centre feature, generally provided by the springs.

All movements of the handlebars in all embodiments may be measured by output devices such as potentiometers, enabling a link to a microprocessor-based unit.

The assembly may also be provided with further sensors which measure, inter alia, pedalling speed (cadence), flywheel speed, heart rate of the user, resistance settings, seating status, etc to provide for a fully interactive exercising experience.

The invention claimed is:

1. A handlebar assembly comprising a lower base portion (101) that is adapted to support a handlebar (202), said handlebar having a centre at a midpoint through a guide means that is so constructed and arranged to permit said handlebar (202) to move along a path relative to said lower base portion (101), whereby upon movement of said handlebar (202) along said path in a direction left or right relative to a central position, said handlebar (202) tilts and said centre of said handlebar (202) moves downwards relative to said lower base portion (101) as well as horizontally from said central position, wherein said guide means comprises one or more links defining a linkage, wherein said linkage comprises at least two non-parallel links being connected at one point along said link to said lower base portion and at a different point along said link to a support for said handlebar, and wherein said two points where said links join said support for said handlebar are spaced apart further than the two points where said links join said lower base portion, said non-parallel links leaning outwardly from one another when said handlebar is in said central position.

2. The handlebar assembly according to claim 1, wherein said handlebar is adapted to move forwards or backwards relative to said lower base portion.

3. The handlebar assembly according to claim 1, wherein said handlebar is adapted to tilt left or right by a the linkage.

4. The handlebar assembly according to claim 1, wherein said two points where said links join said lower base portion lie in a horizontal plane for all positions of said handlebar, while said two points where they join said support for said handlebar lie in a horizontal plane only when said handlebar is in the central position.

5. The handlebar assembly according to claim 1, wherein said base portion comprises a stem shaft (101) that is adapted to be at least partially received within a frame.

6. The handlebar assembly according to claim 1, wherein said path comprises an arc centred about a pivot point located below said centre of said handlebar.

7. The handlebar assembly according to claim 1, wherein said handlebar is adapted to be rotated in a plane relative to said lower base portion.

8. The handlebar assembly according to claim 1, in which a resistance means (215; 217) is provided to oppose movement of said handlebar against any or all of its degrees of freedom.

9. The handlebar assembly according to claim 1, wherein a locking means is provided to enable said handlebar to be locked against movement about any or all of its degrees of freedom.

10. The handlebar assembly according to claim 1, wherein said handlebar moves about a point aligned with said centre of said handlebar.

* * * * *

UNITED STATES PATENT AND TRADEMARK OFFICE
CERTIFICATE OF CORRECTION

| | | |
|---|---|---|
| PATENT NO. | : 7,870,809 B2 | |
| APPLICATION NO. | : 10/487756 | |
| DATED | : January 18, 2011 | |
| INVENTOR(S) | : M. J. P. Rice | |

It is certified that error appears in the above-identified patent and that said Letters Patent is hereby corrected as shown below:

| COLUMN | LINE | ERROR |
|---|---|---|
| 14 (Claim 3, line 2) | 2 | "by a the linkage." should read --by the linkage.-- |

Signed and Sealed this
Tenth Day of May, 2011

David J. Kappos
*Director of the United States Patent and Trademark Office*